C. A. CASE.
ADJUSTABLE GRIPPING LINK FOR VEHICLES.
APPLICATION FILED MAR. 2, 1908.

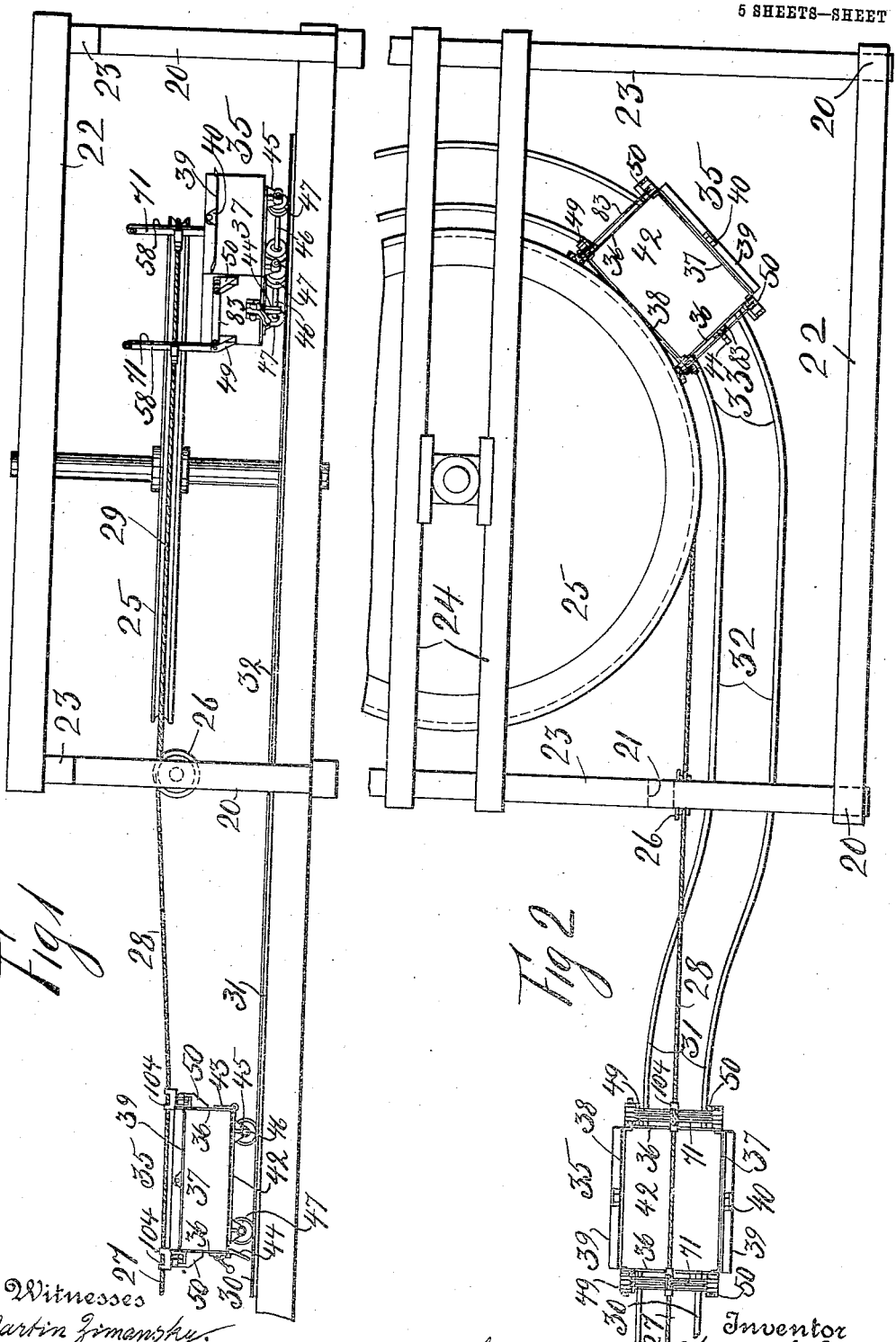

935,586.

Patented Sept. 28, 1909.
5 SHEETS—SHEET 2.

Witnesses
Martin Zimansky
M. H. Cook

Inventor
Charles A. Case
By his Attorney
A. de Bonneville

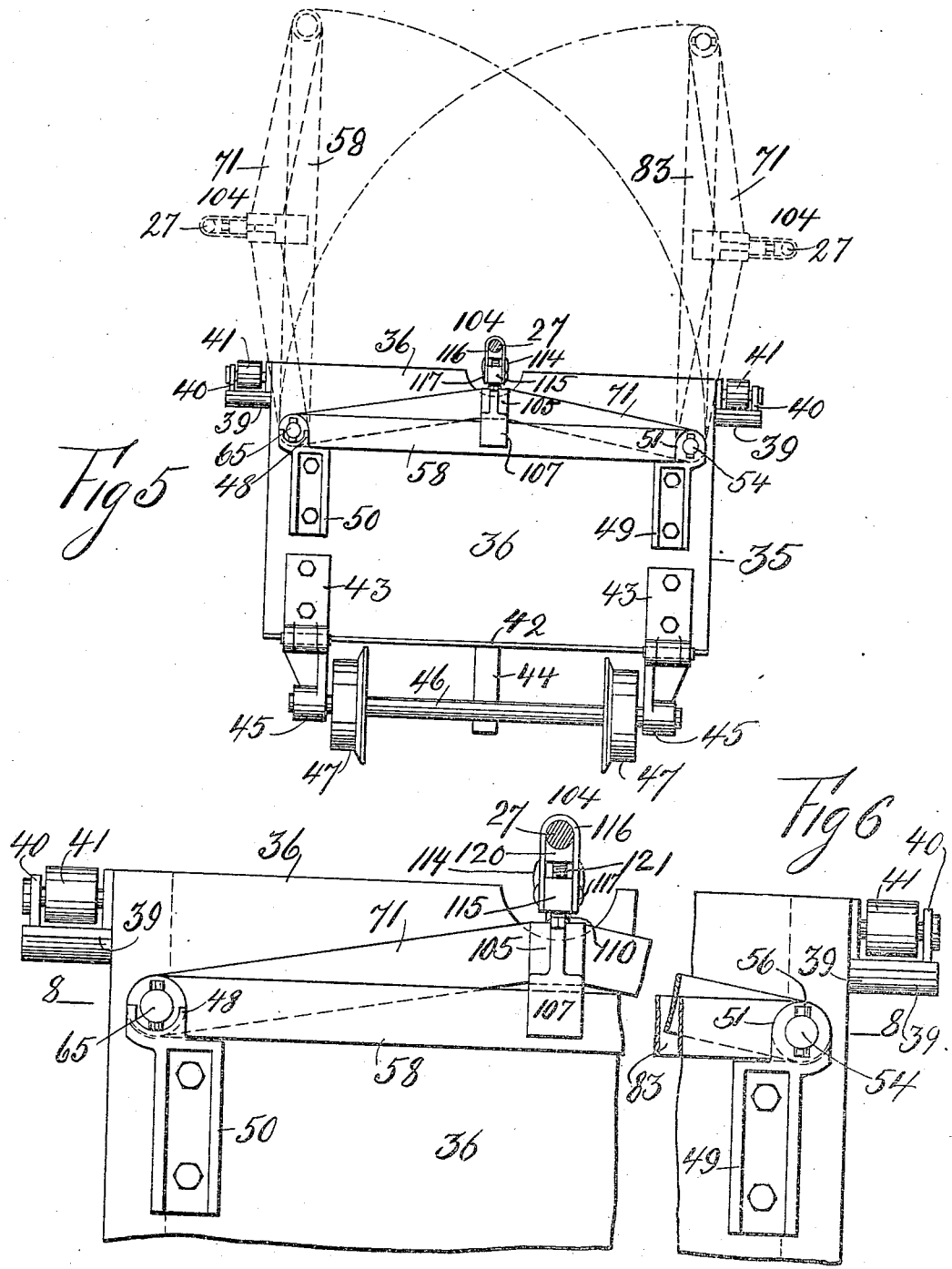

C. A. CASE.
ADJUSTABLE GRIPPING LINK FOR VEHICLES.
APPLICATION FILED MAR. 2, 1908.
935,586.
Patented Sept. 28, 1909.
5 SHEETS—SHEET 4.
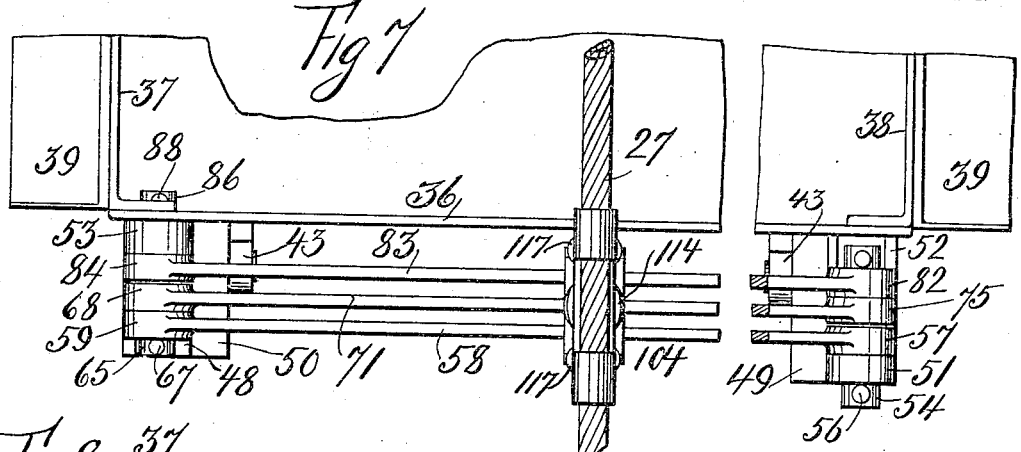
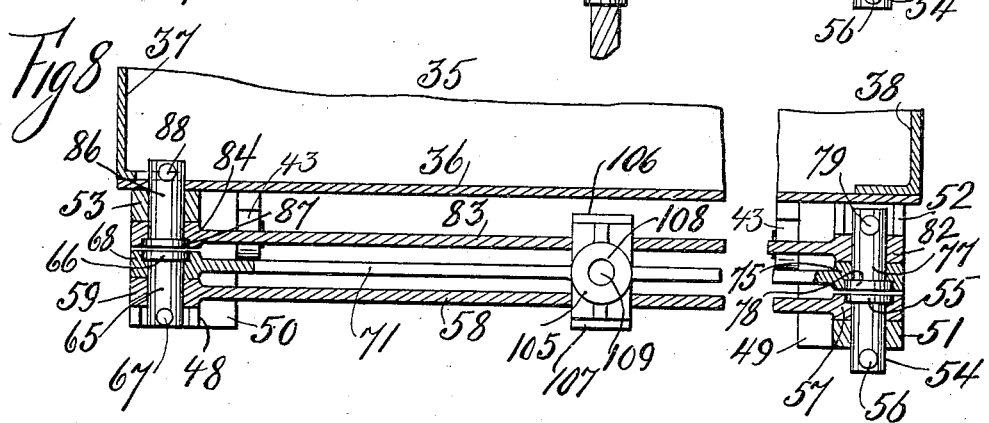
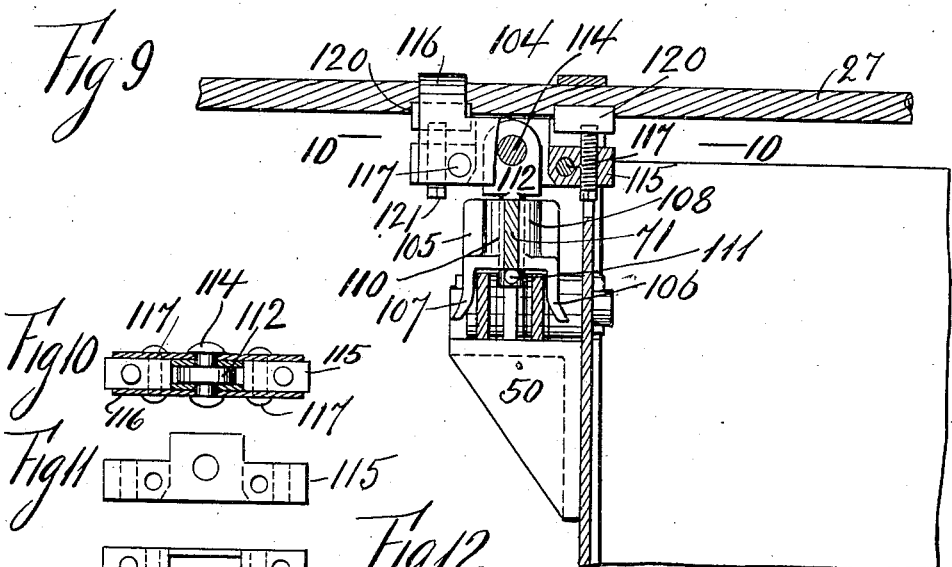
Witnesses
Martin Zimansky
M. H. Cook
Inventor
Charles A. Case
By his Attorney
Aix de Bonneville C. A. CASE.
ADJUSTABLE GRIPPING LINK FOR VEHICLES.
APPLICATION FILED MAR. 2, 1908.
935,586.                    Patented Sept. 28, 1909.
                                    5 SHEETS—SHEET 5.
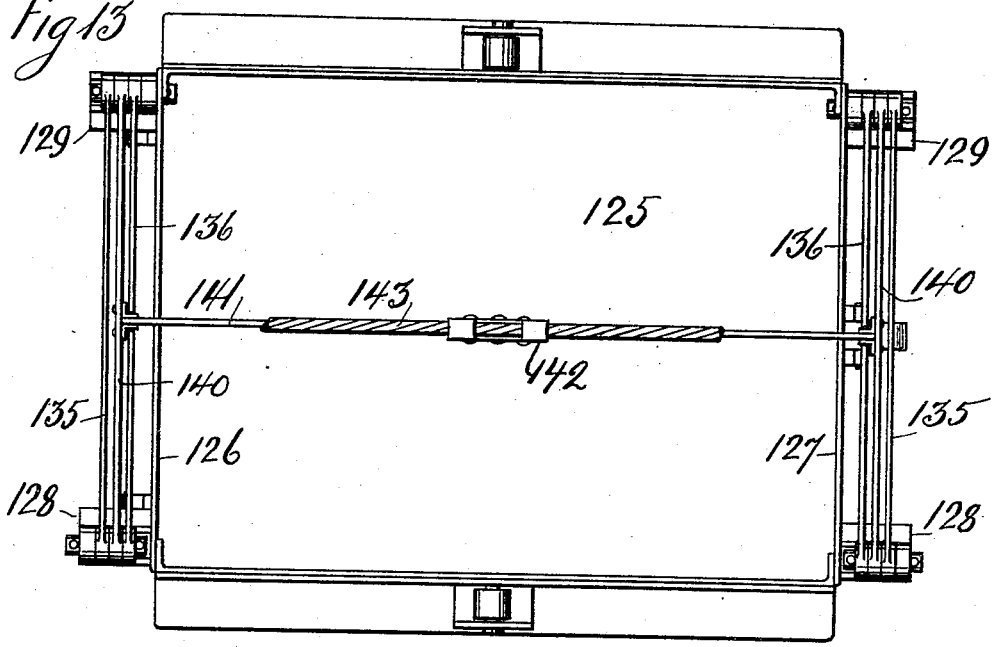
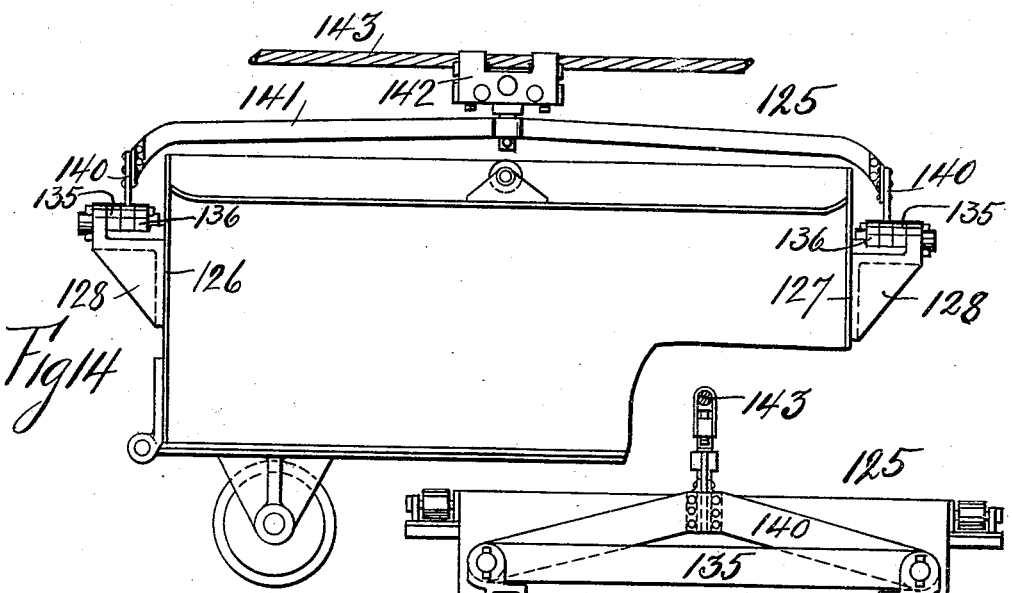
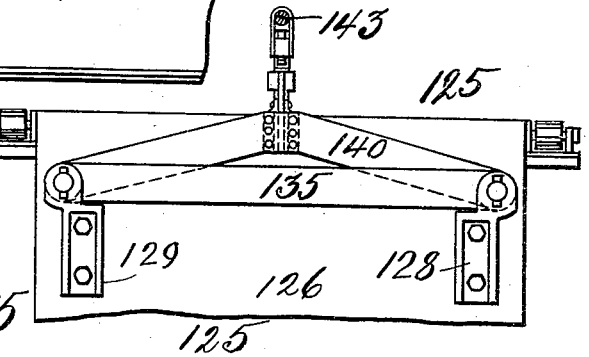

UNITED STATES PATENT OFFICE.

CHARLES A. CASE, OF NEW YORK, N. Y., ASSIGNOR TO CASE TUNNEL & ENGINEERING COMPANY, OF NEW YORK, N. Y., A CORPORATION OF ARIZONA TERRITORY.

ADJUSTABLE GRIPPING-LINK FOR VEHICLES.

935,586.  Specification of Letters Patent.  Patented Sept. 28, 1909.

Application filed March 2, 1908.  Serial No. 418,883.

*To all whom it may concern:*

Be it known that I, CHARLES A. CASE, a citizen of the United States, and a resident of the borough of Manhattan, in the county of New York and State of New York, have invented certain new and useful Improvements in Adjustable Gripping-Links for Vehicles, of which the following is a specification.

This invention relates to means for propelling vehicles, cars and the like in straight paths, and in curved paths diverging to the right or left of the said straight paths, without causing any strains on said vehicles by reason of the changes of the directions of their movements.

The invention primarily comprises one or more adjustable gripping links which each normally carry a gripping device in the line of the longitudinal axis of a car or other vehicle with which it operates. The links swing and rise to one side or other of the vehicle, following the direction of a running rope when the vehicle is changing the direction of its run, as when running from a straight path to a curve, or vice versa.

With the invention vehicles, cars and the like can run around curves without detaching the running rope from said vehicles and cars, and also prevents the derailment of cars when running around curves.

Figure 3:
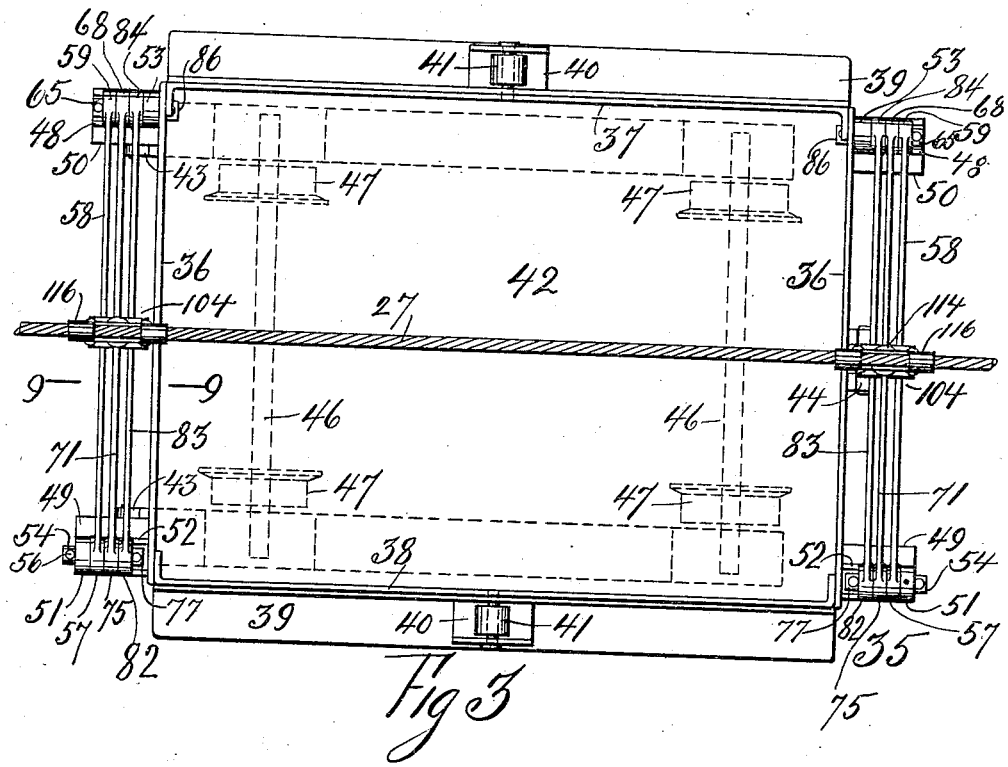
Figure 4:
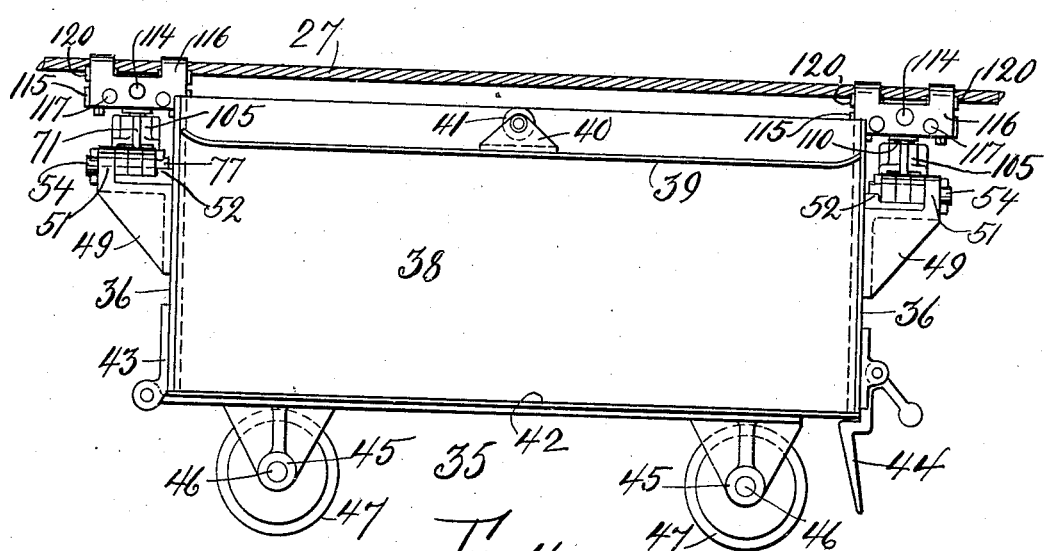

In the drawings Figure 1 represents an elevation of a tramway station, with an exemplification of the invention on a curve and on a straight track, Fig. 2 is a top plan view of Fig. 1, Fig. 3 represents a plan view of a car with the invention, Fig. 4 shows a side view of Fig. 3, Fig. 5 is an end view of Fig. 4 with some of the elements shown in changed positions in dotted lines, Fig. 6 represents an enlarged fragmentary portion of Fig. 5, Fig. 7 shows a top plan view of Fig. 6, Fig. 8 is a partial section of Fig. 6 on the line 8, 8, and Fig. 9 represents an enlarged partial section of Fig. 3 on the line 9—9, Fig. 10 shows a partial section of Fig. 9 on the line 10, 10, Fig. 11 represents an elevation of a grip frame, Fig. 12 is a plan view of Fig. 11, Fig. 13 represents a plan view of a car with a modification of the invention, Fig. 14 is a partial side view of Fig. 13, and Fig. 15 is a partial left hand end view of Fig. 14.

Referring first particularly to Figs. 1 and 2 a tramway station is shown with the posts 20, 21, side girders 22, end girders 23 and the central cross girders 24, a bull wheel 25, guide pulley 26, a running rope 27 inclined at 28 and curved at 29. A pair of straight tracks 30 meet the curved portion 31, after which it is again straight as at 32, the latter running to the curve 33. Cars 35 are shown with the ends 36 and sides 37, 38. To the sides 37, 38 are fastened the angle irons 39 that carry brackets 40 in which are journaled rollers 41, that operate with loading devices not shown. To one of the ends 36 is fastened a hinge bracket 43, to which is hinged a swinging bottom 42, that is locked in place by means of a latch 44 pivoted to the other end of the car. Journal brackets 45 extend from the bottom 42 and in which are journaled axles 46 of the truck wheels 47. Each of the cars 35 has fastened to its ends 36 the brackets 49 and 50. The brackets 49 have extending therefrom the journal lugs 51 and pronged guide lugs 52, and the brackets 50 have extending therefrom the journal lugs 53 and guide lugs 48. In each journal lug 51 is pivoted the pin 54 having at one end the collar 55 and at the other end the cotter pin 56. On each pin 54 is fulcrumed the eye 57 of the outer swinging link 58, a shouldered portion of the said eye engaging the collar 55. At the other end of each outer link 58 is formed the eye 59 in which is pivoted the movable pin 65, having at one end the collar 66 and at the other end the cotter pin 67. On each pin 65 is also pivoted the eye 68 of one of the curved central adjusting gripping links 71. A shoulder in each eye 68 engages with the collar 66 of each pin 65. At the other end of each curved central adjusting gripping link 71 is formed the eye 75, in each of which is pivoted the movable pin 77, having the collar 78 which engages with a shouldered portion of the eye 75, and has the cotter pin 79. Each movable pin 77 supports the eye 82 of one of the outer swinging links 83, at the other end of each of which latter is formed the eye 84. Each eye 84 is pivoted on one of the pins 86 having the collar 87 at one end, which engages with a shouldered portion of the eye 84 and has a cotter pin 88 at its other end. The pins 86 are pivoted in the journal lugs 53. On each central adjusting gripping link 71 is supported a grip 104, comprising a grip support 105 having the guide prongs 106 and 107. A barrel 108 of the grip support 105 has an opening 109 for a shank 110, which latter at its lower end has a cotter pin 111, that holds it in place on the barrel 108. At the upper end of the shank 110 is formed an eye 112 with an opening for a pin 114 which latter carries the grip frame 115. To the frame 115 is riveted the double U shaped grip cover 116 by means of rivets 117. In the cover 116 are located the gripping blocks 120 that are supported on the screws 121, engaging threaded openings in the frame 115. The running rope 27 is engaged between the roof of the U shaped cover 116 and the gripping blocks 120.

In the modification of the invention shown in Figs. 13 to 15, a car 125 has fitted to its ends 126 and 127, brackets 128 and 129 similar respectively to the brackets 49 and 50. Outer swinging links 135 and 136 similar to 58 and 83 are pivoted to the brackets 128 and 129. To the links 135 and 136 are pivoted the curved central adjusting links 140 similar to the links 71. The links 140 are connected by a bail 141 to which is attached a grip 142 for the running rope 143.

To operate the invention when the vehicle or the car 35 is running from a straight run of track as 30, and meets the right handed curve 31, the running rope 27 at its inclination 28 will raise one of the outer links at each end of the car with the central adjusting gripping links 71 and their grips 104. The grips run over the pulley 26, then with the running rope pass around the bull wheel 25. On the other side of the said bull wheel by means of a similar construction not shown, the said outside links with the central gripping links are again lowered to their normal positions to run the car on a straight run of track. If the cars instead of meeting a right handed curve after leaving the straight run of track, meet a left handed curve the other outer links would raise the central adjusting gripping links, and the latter would be lowered when the cars reached a straight run of track.

Having described my invention I claim:

1. In a vehicle the combination of a pair of outer links, each one pivoted at one end thereof to the vehicle and at opposite ends to each other, a central link fulcrumed to the other opposite ends of the outer links, and a grip supported on the said central link.

2. In a vehicle the combination of a pair of outer links and a central link connected thereto, so that the said central link will be raised when raising either one of the outer links, and a grip connected to the central link.

3. In a vehicle the combination of a central link, an outer link pivoted to one end of said central link, and a second outer link pivoted to the other end of said central link, the other ends of the outer links pivoted at opposite portions of said vehicle, and a grip secured to said central link.

4. In a vehicle the combination of an outer link pivoted adjacent to one side thereof, a central link pivoted to the other end of said outer link, a second outer link pivoted adjacent to the other side of said vehicle and the opposite end of the latter outer link pivoted to said central link, and a grip connected to the central link.

5. In a vehicle the combination of a pair of similar brackets secured to one of the ends of the vehicle and adjacent to the sides thereof, a lug formed with one of the said brackets adjacent to the end of the car, a lug formed with the other bracket somewhat distant from the said end of the car, a pin pivoted in a bearing in each of said lugs, a pair of links each with one end pivoted to one of said pins, a pin pivoted in the other end of each of said links, a third link pivoted to the latter pins, and a grip supported on the latter link.

6. The combination of a running rope and a vehicle, a pair of similar brackets secured to one of the ends of the vehicle and adjacent to the sides thereof, a lug formed with one of the said brackets adjacent to the end of the car, a lug formed with the other bracket somewhat distant from the said end of the car, a pin pivoted in a bearing in each of said lugs, a link with one end pivoted to each one of said pins, a pin pivoted in the other end of each of said links, a third link pivoted to the latter pins, and a grip supported on the latter link.

7. The combination of a running rope and a car, an adjusting link pivoted at each end of the car, a grip supported from each of said links, and means to move the said adjusting links.

8. The combination of a running rope and a car, an adjusting link pivoted at each end of the car, a grip supported on each of said links, means to enable the grips with their links to travel with said running rope while the car is moving in a direction at variance with the direction of the travel of the running rope.

9. In a vehicle the combination at each end thereof of a central link, an outer link pivoted to one end of said central link and a second outer link pivoted to the other end of said central link, the other ends of the outer links pivoted at opposite portions of said vehicle, a bail connecting both the central links, and a grip connected to the bail for a running rope.

10. The combination of a running rope and a vehicle, a pair of similar brackets secured to each end of the vehicle, a lug formed with each one of said brackets, a pin pivoted in a bearing in each of said lugs, a link with one end pivoted to each of said pins, a pin pivoted in the other end of each of said links, a third link pivoted to the latter pins of each pair of links at the ends of the car, and a grip supported on each third link for the running rope.

11. The combination of a running rope and a vehicle, a pair of similar brackets secured to one of the ends of the vehicle and adjacent to the sides thereof, a bearing and a guide lug on each of said brackets, a pin pivoted in each bearing, a link with one end pivoted to each one of said pins, a pin pivoted in the other end of each of said links and located to be enabled to engage with the guide lugs, a third link pivoted to the latter pins, and a grip connected with the latter link.

Signed at the borough of Manhattan in the county of New York and State of New York this 29th day of February A. D. 1908.

CHARLES A. CASE.

Witnesses:
JOHN D. WEBBER,
MARTIN ZIMANSKY.